Figure 1:
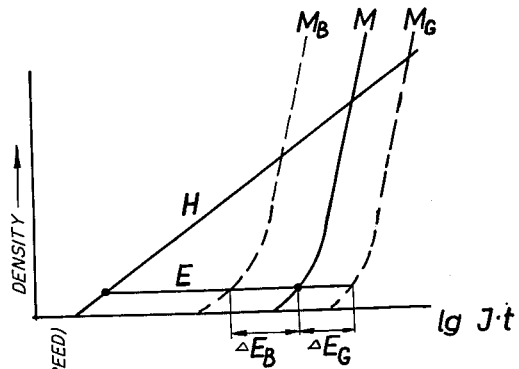
Figure 2:
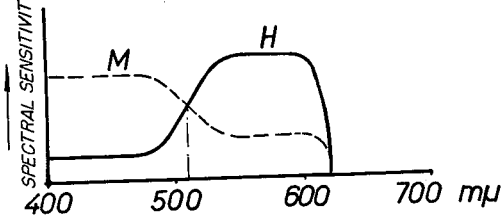

INVENTOR.
EHRHARD HELLMIG 3,141,773
PROCESS AND PHOTOGRAPHIC MATERIAL FOR THE PRODUCTION OF PHOTOGRAPHIC RECORDS AND COPIES WHICH ARE CORRECTED FOR TONE VALUE
Ehrhard Hellmig, Leverkusen, Germany, assignor to Agfa Aktiengesellschaft, Leverkusen, Germany, a corporation of Germany
Filed Feb. 5, 1958, Ser. No. 713,360
Claims priority, application Germany Feb. 12, 1957
7 Claims. (Cl. 96—68)

It is known that black-and-white or monochrome photographic records, especially for use in the printing industry, have tone value defects which are shown in defective definition of the highlights and or shadows. Processes are already known for obviating these defects; the essence of such processes is that the photographic record which has anormal tone value and requires correction is combined with a separate black-and-white record or copy of the same original, which record or copy only contains the corrective for a certain type of tone value or for several tone values simultaneously, these latter records being negatives in case that the record to be corrected is a negaitve or a positive in case that the latter is a positive of the original. For the production of photographic records and/or copies which are corrected for tone value, photographic materials are already known which consist of two superimposed light-sensitive layers of different sensitivity and also speed for the continuous-tone layer and for the highlight masking layer, one of the emulsions being sensitive in a part of the spectrum in which the other is insensitive. Such photographic materials have the disadvantage that the result of exposure to light, regardless of whether this exposure takes place as two partial exposures with lights of different color or as one exposure with light of uniform color, is highly dependent on the color temperature of the light source, so that records, the quality of which differs considerably, are produced by exposure to arc light and incandescent lamp light under otherwise the same conditions.

In order to overcome this disadvantage, it has been proposed in copending application Ser. No. 666,343, filed June 18, 1957, to use two emulsions which may be sensitive in substantially the same spectral regions for the continuous-tone layer and for the masking layer.

Such a material is most suitable for exposure with light sources of different color temperature or color of light, since the said two layers will always respond in the same manner as they have the same spectral sensitivity, so that their relative speed ratio also always remains the same. Such a material is however not well suited as a copying material, since in copying, owing to the different range of contrast of the negatives, it is necessary to be able to obtain a variation in the speed ratio between the continuous-tone and masking layers by varying the color of the light. That such a material shall have the same spectral sensitivity for the continuous-tone and for the masking layer and that the individual layers shall have speeds which can be influenced relatively to one another by changing the color of the light are therefore two mutually exclusive requirements, so that no solution has so far been found for the problem of using for exposure and copying purposes a photographic material which is largely independent of the color temperature.

It has now been found that these two contradictory requirements can be fulfilled in a manner sufficient for practical purposes if a photographic element is used comprising a continuous-tone silver halide emulsion layer and a masking layer and in which the emulsions for the continuous-tone and masking images are in fact sensitive in substantially the same partial range of the spectrum, or even in the entire visible spectrum, but the speed ratio of these emulsions is not constant over the entire common sensitivity range. The maximum and minimum ratio of the average speeds of the two emulsions preferably do not differ by more than a factor of 25 (1.4 in logarithmic units) in each partial zone of the spectrum which extends over a third of the total sensitivity range.

The following examples and FIGS. 1 to 4 serve to explain the invention.

*Example 1*

A material in accordance with the invention consists of a light-sensitive continuous-tone layer H (gelatino-silver bromo-iodide emulsion layer of $10\mu$ thickness) and a masking layer M (gelatino-silver chloro-bromide emulsion layer of $8\mu$ thickness) which is of substantially lower speed (ratio $\frac{1}{30}$). The speed range thereof is expressed by setting out their individual density characteristic curves (FIG. 1) through the distance E (measured 0.3 above the fogging level). Exposure is effected with unfiltered light (for example arc light) and development in a developer according to Example 2. The spectral sensitivities of the two layers are shown by way of example in FIG. 2; both layers are orthochromatic, the continuous-tone layer having pronounced speed in the green region of the spectrum, while the masking layer M has a pronounced speed in the blue region of the spectrum. (This figure merely illustrates the speed distribution within the individual layers but not their relative speeds. The sensitivity of the layer H is in fact substantially higher than that of the layer M.)

Figure 3:
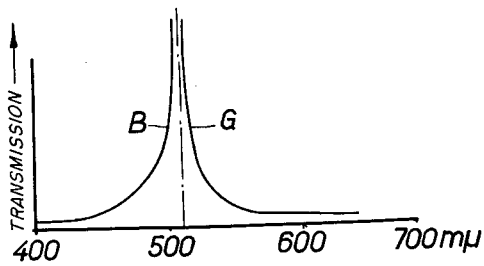

If the photographic material is not exposed with white light, but with light from the blue region of the spectrum, for example through a filter with the spectral transmission curve B (FIG. 3), the masking layer M is affected relatively more strongly than the continuous-tone layer owing to its comparatively high blue speed; after development as above it now assumes the position indicated by the curve $M_B$ in FIG. 1, its speed relatively to that of the continuous-tone layer H thus having increased by the amount $\Delta E_B$ as compared with the position of the curve M obtained with white light. In a corresponding manner, the speed of the mask M is lowered when the photographic material is exposed using a yellow filter of the spectral density indicated by the curve G (FIG. 3). The position of the characteristic curve of the mask is shown in this case by the curve $M_G$ in FIG. 1 and the relative decrease in speed is indicated by $\Delta E_G$. It is apparent that the degree of change of speed $\Delta E_B$ or $\Delta E_G$ varies in proportion to the difference in speed of response to light of different wave lengths between layers M and H. For example, if the speed ratio of the masking layer and continuous-tone layer in the blue region of the spectrum, as compared with that in unfiltered light, is increased (see FIG. 2) by a factor of 4, then $\Delta E_B = \log 4 = 0.602$. This means a lowering of the speed spacing of the continuous-tone and masking layers by this amount (see FIG. 1). It correspondingly follows that a change in the speed ratio between the masking layer and the continuous-tone layer in the green range of the spectrum by a factor of 3 means that the speed of the masking layer is decreased by an amount $\Delta E_G = \log 3 = 0.477$ as compared with unfiltered light. The speed of the mask can be influenced within the range indicated by the value $E_B + E_G = 0.602 + 0.477 = 1.079$. This value is the factor by which the two ratios 4 and ⅓ differ from one another (12 in this case) calculated in logarithmic units ($\log 12 = 1.079$). It is apparent that the range V within which the masking layer can be influenced by exposure to light of different wave lengths is determined by the ratio in equation $$V = \frac{V_{max}}{V_{min}}$$

$V_{max}$ representing the maximum ratio and $V_{min}$ the minimum ratio in the average speed of the two layers, each over one third of the common sensitivity range.

The two curves $M_B$ and $M_G$ (FIG. 1) represent the limiting positons between which the sensitivity of the masking layer can be varied by varying the color of the light; it is not possible to go beyond these positions, whatever the color of light may be chosen, and in particular it is not possible to "exclude" one of the two layers by using colored light, this being in contrast to the known photographic materials of this type. Since the amount by which the mask can be displaced by colored light is limited, the influence of the color temperature of the light source used for exposure therefore remains limited, and yet nevertheless by using colored light (color filters) it is possible to vary the speed of the masking layer to the aforementioned extent in copying.

In practical tests, it has been established that the desired results are attained when V is 25 (log $V$=1.40) or less, provided it is within the range between 1.5 and 25; the preferred range being between 2 and 20. The average values of the speed must always be calculated in one-third of the common sensitivity range to give a basis for $V_{max}$ and $V_{min}$.

*Example 2*

Figure 4:
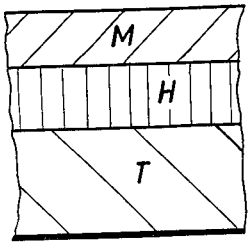

As illustrated in FIG. 4, a light-sensitive emulsion H consisting essentially of silver bromide and gelatine (continuous-tone emulsion) is cast on a transparent support T consisting of acetyl cellulose, this emulsion being capable of development in a developer of the composition set out hereinafter to a gradation of $\gamma$=0.8. This emulsion is orthochromatically sensitised by known optical sensitisers in such a manner that the speed with respect to green light is four times as great as the speed with respect to blue light.

A second gelatino-silver bromide emulsion layer M (masking emulsion) is cast above the first-mentioned layer and this second layer is also orthochromatically sensitized, but in such manner that its sensitivity with respect to blue light is just the same as to green light. This second layer, after development in a developer of the composition set out hereinafter, must give a gradation of 2.0, and, after exposure of the two-layer film with white light, must have a speed which measured at a value of 0.3 above the fogging level, is lower by a factor of 40 than that of the first-mentioned layer.

Tihs material is used for the production of photographic records, via a reproduction camera, of a black-and-white continuous-tone original with arc light and for the production of copies of a black-and-white negative using incandescent light, blue light being used as well as white light for producing improved shadow delineation in the copy, the said blue light preferentially affecting the masking layer.

For development purposes, the following developer is used:

| | | |
|---|---|---|
| Water | cc | 1000 |
| p-Methylaminophenol-sulfate | g | 7.4 |
| Anhydrous sodium sulphite | g | 40 |
| Hydroquinone | g | 3.5 |
| Anhydrous sodium carbonate | g | 30 |
| Potassium bromide | g | 3 |

Development time 4 minutes with diluted developer (1 part developer: 2 parts water).

The material according to the invention shows the advantages set forth not only when used as an exposure material, but also shows additional advantages when used as copying material. Since the position of the characteristic curve of the masking layer is only capable of being shifted within a limited range by colored light, the material is comparatively insensitive to incorrect exposures with colored light. This great tolerance guards against many defective results; it therefore increases the reliability of working, which is to the advantage of the quality of the copies and leads to savings in time and material.

The two-layer material according to the invention is amenable to a wide range of different layer arrangements, and methods of sensitisation, and processing, etc. The two light-sensitive layers can for example be arranged on the same side of the support, or can be on different sides. When the layers are arranged on the same side of the support, the continuous-tone layer can be adjacent to the support and the masking layer on the upper side, or vice versa. The first-mentioned arrangement is the one preferred, because it is possible for the mask to be reduced if over-exposure has occurred, for example by the use of dilute Farmer's reducer.

The spectral sensitivity is not restricted as in the above example to the blue and green regions of the spectrum: it can extend over other and if desired separate parts of the spectrum or over the entire visible spectrum. For changing the blue sensitivity of the lowermost layer, as in the above example, a yellow filter capable of being bleached out in the processing baths can be applied above this layer in known manner or the layer can be dyed with a suitable dyestuff.

In the material according to the invention the ratios of the speed of the continuous-tone layer and the masking layer and the gradation can also be varied. The gradation of the masking layer is the same as or greater than the gradation of the continuous-tone layer, but it can be substantially greater (as in the above example) and is not subject to any limitation. Moreover, there is no limitation on the speed of the masking layer relatively to the continuous-tone layer. For normal reproduction purposes, for example for the production of photographic records of non-transparent originals, a speed ratio of 1/10 to 1/100, preferably 1/20 or less is favourable.

Furthermore, the invention is not limited to processing the record to form a black-and-white image (metal image); it can also be a color image or silver-containing color image produced by any desired process, such as proposed for example in my copending applications Ser. No. 571,793, filed on March 15, 1956, Ser. No. 613,221, filed on October 1, 1956, Ser. No. 684,753, filed on September 18, 1957.

By using the procedure of the last-mentioned application, the process can also be used for the production of copies corrected for tone value in the highlights and shadows, in which case the material according to the invention is exposed and is then converted into either a color image or a silver-containing color image, this image being so produced that it shows a steeper gradation in the higher densities than in the lower densities and that it absorbs actinic light of different wavelengths to different degrees and thus yields gradations of different steepness in the copying process, depending on the copying light which is used. This image is then copied with two types of light, either simultaneously or successively, on to a material sensitive to both types of light, in such a way that an image of the original with corrected highlight definition is produced by one type of actinic light and an image with corrected shadow definition is produced with the other type of actinic light, so that the resultant picture is corrected as regards shadow and highlight definition. As copying material, it is advantageous to use a material which has a steeper response to the type of light more strongly absorbed by the color or silver-containing color image than to the type of light less strongly absorbed by this image. As copying material, it is possible in this case to use the same material as used for the exposure. The latter can contain a yellow coupler such as a derivative of benzoylacetic acid anilide or a magenta coupler such as a pyrazolone derivative and can be processed after exposure with an alkaline aqueous solution of a primary aromatic amino developing agent such as diethyl-para-phenylenediamine to provide a silver-containing colored image. If a combination of a yellow and a magenta coupler is added to the exposure material, the exposed material is preferably processed to produce a purely orange image, by bleaching the silver image after color development.

The invention is also not limited to a light-sensitive material with the layer structure which has been described and which consists of two separate layers. It can for example consist of a single light-sensitive layer, which responds to light of different color with gradations of different steepness and with different speed. For this purpose, it is for example possible to use an emulsion consisting of at least one emulsion part operating as a continuous-tone emulsion and an emulsion part which is more contrasty and has a lower speed, the separate parts of the emulsion having different speed to light and the spectral sensitivity thereof not being lost when the emulsions are mixed together. In such a case, a limited exchange of the specific sensitivity of each individual emulsion is not disadvantageous, but on the contrary is necessary for carrying out the process. Such emulsions can be produced in known manner by adding optical sensitizers to the partial emulsions, these sensitizers remaining combined with the corresponding silver halide grains after the partial emulsions have been mixed. Such a material consisting of one light-sensitive layer has the further advantage of more simple manufacture.

*Example 3*

On a transparent film support there is coated a gelatino-silver bromide emulsion containing per litre 25 mg. of 3,3,9-triethyl-5,5'-diphenyloxacarbocyanineiodide to produce a layer of 0.012 mm. thickness (continuous tone layer). On this layer is coated a silver halide emulsion containing per litre 15 mg. of N,N'diethylisocyanineiodide to produce a layer of 0.006 mm. thickness (masking layer). The speed of this layer when exposed to incandescent light (2850° K.) and developed as disclosed in Example 2 is $\frac{1}{20}$ that of the continuous tone layer, the gradation of the continuous tone layer is gamma=0.9 and that of the masking layer gamma=2.8.

For producing the continuous tone layer the silver halide emulsion disclosed in Fiat Final Report 943, page 47, and for producing the masking layer the silver halide layer disclosed in Fiat Final Report 360, page 24, may be used.

This material is exposed in a reproduction camera to a continuous tone black-and-white original by means of arc light or incandescent light. The exposed material is developed as disclosed in Example 2 and fixed. There is obtained a tone value corrected silver image.

This silver image is bleached by treating it for 5 minutes in a 10% aqueous solution of potassium ferricyanide and washed. Thereafter the image is developed with daylight in a color forming developer containing a color coupler for the production of a yellow color image. As a developer there may be used the following solution:

| | |
|---|---|
| Para - diethylaminoaniline - sulfate _____ g__ | 5 |
| Sodiumsulfite (anhydrous) _____ g__ | 2 |
| Potassium carbonate _____ g__ | 60 |
| Potassium bromide _____ g__ | 3 |
| Benzoylacetic acid anilide _____ g__ | 1 |
| Water _____ cc__ | 1000 |

After development for 5 minutes the material is fixed, washed and dried.

The yellow color and silver image is printed by means of green and blue light onto the same two layer material (exposure by means of incandescent light first through a green filter (e.g. "Agfa" filter 54) and then for the same time through a blue filter (e.g. "Agfa" filter 552)). The print is developed as described above to produce a positive black-and-white silver image which is corrected for tone value in the highlights and in the shadows. This print may be used according to known manner for the production of printing forms for intaglio printing after it is printed on a bichromated gelatine layer.

I claim:
1. A photographic material comprising, in combination, a support, a continuous-tone silver halide photographic emulsion, and a second less sensitive silver halide photographic emulsion of greater gamma value deposited thereon, both of said emulsions being sensitive to substantially the same spectral region but differing in speed within said spectral region, the second emulsion having a speed of about .1–.01 of the speed of said continuous-tone emulsion, the maximum and minimum ratio of average speeds of the two emulsions, when averaged over each partial zone of the spectrum extending over one-third of said spectral region, differing by a factor of 1.5–25.

2. In the process for the production of photographic tone corrected images wherein a continuous-tone original is photographically exposed onto a light-sensitive silver halide material comprising a continuous-tone silver halide emulsion and a masking silver halide emulsion having less speed but a greater gamma value than the continuous-tone emulsion to produce a latent image of essentially all tone values of said original in said continuous-tone silver halide emulsion, and a latent image of only part of the tone values of said original in said masking silver halide emulsion, said part of the tone values in the latent image of the masking emulsion layer being the highlight tone values for a positive original and the shadow tone values for a negative original, and thereafter developing said exposed silver halide material in a developer to produce a continuous-tone image in said exposed continuous-tone emulsion and a tone-correction mask in said masking emulsion, the improvement comprising employing a continuous-tone emulsion and a masking emulsion which are photographically sensitive in the same regions of the photographic spectrum, the continuous tone having a faster relative speed in a first portion of the common sensitivity region than in a second portion, and the masking layer having relatively slower speed in said first portion than in said second portion, the maximum and minimum ratio of the average speeds of the two emulsions differing by not more than a factor of 25 when averaged over about one-third of the common photographic spectrum and the general speed of said masking emulsion layer is about .1 to .01 of the general speed of said continuous-tone silver halide emulsion layer.

3. A photographic material according to claim 1 wherein the continuous-tone emulsion is coated on one surface and the said masking emulsion on the other surface of the support.

4. A process according to claim 2 wherein said exposed silver halide material is processed to form an image selected from the group consisting of (1) an image consisting of silver particles, (2) an image consisting of dyestuff particles, and (3) an image consisting of both silver and dyestuff particles.

5. A process according to claim 2, wherein the silver halide emulsions are sensitive to the blue and green parts of the spectrum.

6. A process according to claim 2 wherein the continuous-tone emulsion is coated on a support and the masking emulsion is coated over the continuous-tone emulsion.

7. A process according to claim 4 wherein the developed photographic image is a dyestuff image selected from the group consisting of yellow, magenta and orange dyestuff images.

References Cited in the file of this patent
UNITED STATES PATENTS

| | | |
|---|---|---|
| 1,303,635 | Capstaff _____ | May 13, 1919 |
| 1,804,727 | Weaver _____ | May 12, 1931 |

(Other references on following page)

UNITED STATES PATENTS

| | | |
|---|---|---|
| 2,202,026 | Renwick | May 28, 1940 |
| 2,239,698 | Carroll | Apr. 29, 1941 |
| 2,449,966 | Hanson | Sept. 21, 1948 |
| 3,050,391 | Thompson et al. | Aug. 21, 1962 |

FOREIGN PATENTS

| | | |
|---|---|---|
| 732,691 | Great Britain | June 29, 1955 |

OTHER REFERENCES

"Glossary of Photographic Terms," U.S. Dept. of Defense, Mil–HDFK–25, TM–11–411, Call No. TK/6550 U 69, February 1961.

Baker: "Photographic Emulsion Technique," 1948; pub. by American Photographic Publishing Co., pages 235 and 236 relied on. Cat. No. TR/210/B23/1948.